US009766324B2

(12) United States Patent
Katz et al.

(10) Patent No.: US 9,766,324 B2
(45) Date of Patent: Sep. 19, 2017

(54) MULTIPLE ANTENNA COMMUNICATION SYSTEM CONFIGURED TO DETECT OBJECTS

(71) Applicant: MICROSOFT TECHNOLOGY LICENSING, LLC, Redmond, WA (US)

(72) Inventors: Marshall Joseph Katz, Seattle, WA (US); Charbel Khawand, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 329 days.

(21) Appl. No.: 14/705,693

(22) Filed: May 6, 2015

(65) Prior Publication Data
US 2016/0327634 A1 Nov. 10, 2016

(51) Int. Cl.
*G01S 7/40* (2006.01)
*H01Q 1/24* (2006.01)
(Continued)

(52) U.S. Cl.
CPC ............ *G01S 7/4008* (2013.01); *G01S 7/411* (2013.01); *H01Q 1/245* (2013.01);
(Continued)

(58) Field of Classification Search
CPC ..... G01S 2007/4013; G01S 2013/0254; G01S 7/4008; G01S 7/411; H01Q 1/245
(Continued)

(56) References Cited

U.S. PATENT DOCUMENTS 5,606,335 A   2/1997   English et al.
8,508,592 B2   8/2013   Furxhi et al.
(Continued)

FOREIGN PATENT DOCUMENTS

IN   WO 2012143936 A1 * 10/2012   ............ H01Q 1/242
RU   2011137466 A   3/2013
(Continued)

OTHER PUBLICATIONS

International Search Report and Written Opinion Issued in PCT Application No. PCT/US2016/026303, Mailed Date: Jul. 19, 2016, 11 Pages.
(Continued)

*Primary Examiner* — Timothy A Brainard
(74) *Attorney, Agent, or Firm* — Fiala & Weaver P.L.L.C.

(57) ABSTRACT

Methods, systems, apparatuses, and computer program products are provided for detecting objects, including humans, using a mobile communications device. A communication space is scanned with a beam-shaped signal transmitted by a phased antenna array of the mobile communications device. Information is discerned from one or more attenuated signals received from the communication space based on the beam-shaped signal. The information is analyzed to determine an object in the communication space. Whether the object is likely at least a portion of a human is determined. A communication signal transmitted by the phased antenna array is modified in response to determining that the object is likely at least a portion of a human, and that the at least a portion of the human has a predetermined spatial relationship with the phased antenna array.

20 Claims, 8 Drawing Sheets

(51) Int. Cl.
- *H04B 1/3827* (2015.01)
- *G01S 7/41* (2006.01)
- *H04W 8/24* (2009.01)
- *G01S 13/02* (2006.01)
- *H04W 88/02* (2009.01)

(52) U.S. Cl.
CPC ............ *H04B 1/3838* (2013.01); *H04W 8/24* (2013.01); *G01S 2007/4013* (2013.01); *G01S 2013/0254* (2013.01); *H04W 88/02* (2013.01)

(58) Field of Classification Search
USPC .......................................................... 342/90
See application file for complete search history.

(56) References Cited

U.S. PATENT DOCUMENTS

| | | |
|---|---|---|
| 2008/0051165 A1 | 2/2008 | Burgan et al. |
| 2010/0145190 A1 | 6/2010 | Bourqui et al. |
| 2010/0279751 A1 | 11/2010 | Pourseyed et al. |
| 2011/0109497 A1 | 5/2011 | Yano |
| 2012/0064841 A1 | 3/2012 | Husted et al. |
| 2013/0210477 A1 | 8/2013 | Peter |

FOREIGN PATENT DOCUMENTS

| | | |
|---|---|---|
| WO | 2005112593 A2 | 12/2005 |
| WO | 2012143936 A1 | 10/2012 |

OTHER PUBLICATIONS

"International Preliminary Report on Patentability Issued in PCT Application No. PCT/US2016/026303", Mailed Date: Feb. 16, 2017, 7 Pages.

\* cited by examiner

MULTIPLE ANTENNA COMMUNICATION SYSTEM CONFIGURED TO DETECT OBJECTS

BACKGROUND

When communicating with other devices, mobile devices such as cell phones transmit radiation in the form of communication signals. The transmitted radiation may be received and be reflected, passed, and/or absorbed by nearby objects. Living objects, such as humans, may absorb the radiation emitted by a mobile device and be harmed thereby. The closer the living object is to the transmitting antenna of the device, the more radiant energy that is absorbed. For example, the head, an ear, or a hand of a human using a cell phone to make a phone call may absorb a substantial amount of the transmitted radiation.

Accordingly, specific absorption rate (SAR) testing is being required for mobile devices to protect humans from the emitted radiation. SAR is a measure of the rate at which energy is absorbed by the human body when exposed to a radio frequency (RF) electromagnetic field. Various governments have defined maximum SAR levels for RF energy emitted by mobile devices.

Current techniques for object detection are implemented through circuitry. For example, a resonance circuit may be connected to a sense antenna. When an object approaches the sense antenna, the resonance frequency shifts. The resonance frequency shift can be measured, and a particular amount of shift may indicate that a nearby object is detected. Another technique uses IR (infrared) LEDs (light emitting diodes) with IR sensors to emit light and measure the light reflected back.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for detecting objects, including humans, using a mobile communications device. A communication space is scanned with a beam-shaped signal transmitted by a phased antenna array of the mobile communications device. Information is discerned from one or more attenuated signals received from the communication space based on the beam-shaped signal. The information is analyzed to determine an object in the communication space. Whether the object is likely at least a portion of a human is determined. A communication signal transmitted by the phased antenna array is modified in response to determining that the object is likely at least a portion of a human, and that the at least a portion of the human has a predetermined spatial relationship with the phased antenna array.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
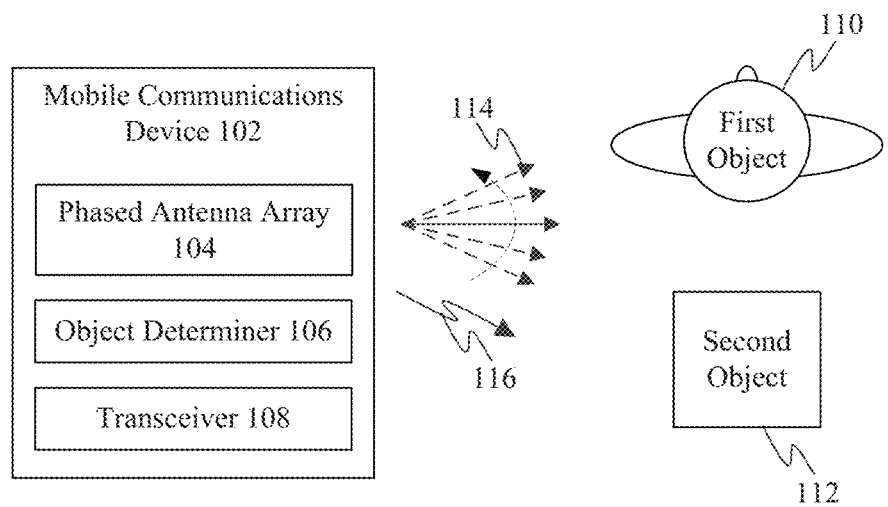
FIG. 1 shows a block diagram of communication space in which a mobile communications device scans for objects with a phased antenna array, and modifies a transmitted communication signal when a human is detected nearby, according to an example embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Detecting Objects in a Communication Space

When communicating with other devices, mobile devices such as cell phones transmit radiation in the form of communication signals. The transmitted radiation may be received and be reflected, passed, and/or absorbed by nearby objects. Living objects, such as humans, may absorb the radiation emitted by a mobile device and be harmed thereby. The closer the living object is to the transmitting antenna of the device, the more radiant energy that is absorbed. For example, the head, an ear, or a hand of a human using a cell phone to make a phone call may absorb a substantial amount of the transmitted radiation. Accordingly, specific absorption rate (SAR) testing is being required for mobile devices to protect humans from the emitted radiation.

An antenna array may be used by a mobile communications device for active communications, such as phone calls (e.g., cellular transmissions of voice) or data communications (e.g., over wireless networks such as wireless local area networks (LANs)). Whether or not the antenna array is currently in active use, the antenna array may be used to detect objects near the antenna array. For instance, an object may be detected by the antenna array when the object attenuates communication signals transmitted by the antenna array, and the attenuated signals are received by a second communications device, and/or when communication signals are transmitted from the antenna array and reflected back from the object and received by the mobile communications device as attenuated signals. The attenuated signals may be analyzed to determine whether an object is present. If a detected object is one that may be harmed by radiation emitted by the antenna array during active communications, a transmission power of the antenna array and/or a direction of the transmitted signal may be reduced to decrease or eliminate harm to the detected object.

In embodiments, communication systems in practice or under development, such as 802.11ad, LTE (long term evolution), and 3GPP 5G technologies, may implement beam forming by a many-antenna array to achieve high data rates. At these high frequencies, an object may present a high loss when a transmitted RF beam is narrow. Accordingly, a beam scanning technique may be implemented in such communication systems. The timing of reflections of the scanned beam off of objects in the vicinity can be measured, and the communication system can be configured in a manner similarly to radar or otherwise, to enable object detection to be used by the mobile communications device for various purposes.

For example, a mobile communications device with a many antenna system may communicate with a second communications device. Objects between them, and thus in the way of the communication signal, may absorb and/or scatter the communication signal. Flat and metallic objects tend to reflect the communication signal, while humans and similar objects (e.g., organic objects) tend to absorb the communication signal. In a many-antenna system, the antennas may be configured to scan through a half sphere with a beam of variable width and power. While the mobile communications device is transmitting, an access point or other second communications device that it communicates with may report back to the mobile device a received power that it detects. With the transmitted power of the beam, and the received power (detected by the second device), both known, the pathloss can be calculated. When an object intersects between the mobile device and the second device, the pathloss is caused to increase, and this increase in pathloss may be used to detect the presence of an object. In response, the mobile device can tune the many-antenna array to another configuration that has a lower pathloss to re-enable communications. In one embodiment, instead of attempting to find the lowest pathloss direction, the mobile device may instead perform a scan of all possible paths and construct a map of pathloss to determine whether an object is present. The map may indicate the location of the object, and the device may use the location information to reorient the beam in a selected direction to avoid the object. Additionally, because the relative size at which an object appears to the mobile device is based on the distance and absolute size of the object, an estimation of the distance to the object can be made if a size is assumed. Using the estimated distance and the directional information obtained from the scan, a nearby object can be detected and its location relative to the mobile device can be calculated. This relative location to the device can then be used for one or more purposes, including re-orienting a direction of communication signals transmitted by the antenna array, reducing a communication signal power, and/or other modification of the communication signal.

In another embodiment, the directivity and amount of signal reflection from an object may be determined based on a material from which the object is made, the shape of the object, and/or a surface roughness of the object. A frequency of the transmitted signal also may change the reflection percentage and directivity, and thus may be taken into account. Using a similar method as described above, the antenna array of the mobile communications device may perform a scan, and the antenna array itself (or other antenna of the mobile device) may receive and detect the energy of the reflected signal. This method does not require a second device to communicate with the mobile device, and can be used while communicating (or not communicating) with a second device. The power measured by one or more receivers on the mobile device is a function of the distance to the object, the reflection directivity of the object, and a percentage of energy that is reflected. For example, a smooth metallic object tends to reflect a large percentage of the energy of a received narrow beam in a narrow reflected beam that causes a small spot of reflected energy. The size of the reflected spot of energy will tend to be smaller for a closer object and larger for a farther away object. Additionally, the total power that is received at the mobile device will tend to be greater for a close object due to air losses having less effect relative to a further away object. Objects such as human hands will tend to not reflect much energy, and any such reflected energy will tend to be spread over a large area due to surface roughness (of skin) and poorer conductivity, while objects like paper will not reflect much at all, but will tend to absorb the received energy.

These embodiments may be combined in any manner in further embodiments (e.g., a two-device embodiment may analyze both pass loss and reflected power), and an amount of RF absorption, reflection percentage, and distance can be calculated. Using this information the size, shape, and/or material of an object can be determined and used by a mobile communications device for various purposes, such as power back off or antenna tuning (e.g., directivity, beam shape, etc.). A mobile communications device may be configured to scan for objects as described herein as often as desired, because the communication space may change continuously (e.g., due to the mobile communications device moving, humans entering or leaving the space, humans picking up or setting down the device, etc.). Example periodicity for scanning for objects includes once per minute, once per ten minutes, once per hour, or greater or lesser periodicity.

Embodiments may be implemented in various environments. For instance, FIG. 1 shows a block diagram of a communication space 100 in which a mobile communications device 102 resides. Mobile communications device 102 is configured to wirelessly communicate with other communications devices (not shown in FIG. 1) that are mobile or stationary. As shown in FIG. 1, mobile communications device 102 includes a phased antenna array 104, an object determiner 106, and a transceiver 108. Mobile communications device 102 and its elements are described as follows.

Mobile communications device 102 may be any type of mobile device capable of wireless communications, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), a personal navigation assistant, a wearable device, or other type of mobile device. Mobile communications device 102 may also be a module or component within an appliance, such as a television or refrigerator, or a data collection device located in the environment.

Phased antenna array 104 is an array of antennas (antenna elements) in which the relative phases of the respective signals feeding the antennas are configured such that the effective radiation pattern of phased antenna array 104 forms a beam (e.g., the pattern is reinforced in a desired direction and suppressed in undesired directions). The phase relationships among the antennas are adjustable to enable beam steering and creations of other antenna signal patterns. For example, as shown in FIG. 1, phased antenna array 104 may transmit a beam-shaped signal 114. In other embodiments, other transmitted signal shapes may be used. In the example of FIG. 1, as indicated by the dotted straight-line arrows, beam-shaped signal 114 may be steered into multiple different directions, the steering of which is indicated by the curved, dotted arrow. Physical movement is not required to aim beam-shaped signal 114. Instead, beam-shaped signal 114 is moved electronically, and may be steered to a plurality of positions to cover communications space 100.

Phased antenna array 104 may include any number of antennas, including two, four (e.g., 2-by-2 array of antennas), eight (e.g., a 2-by-4 array of antennas), sixteen (e.g., a 4-by-4 array of antennas), thirty-two (e.g., a 4-by-8 array of antennas), sixty-four (e.g., an 8-by-8 array of antennas), or even greater numbers of antennas. Phased antenna array 104 may be implemented in one or more semiconductor chips and/or packages included in mobile communications device 102.

Transceiver 108 is a radio frequency (RF) transceiver configured for transmitting and receiving communication signals. For instance, in an embodiment, transceiver 108 is coupled to phased antenna array 104 to modulate, up-convert, and provide signals to phased antenna array 104 for transmission, and to receive, down-convert, and demodulate signals that were received at phased antenna array 104. Accordingly, transceiver 108 may provide signals to phased antenna array 104 to be transmitted in beam-shaped signal 114. Communication signal 116 is an example of a communication signal (e.g., voice, other audio, video, or other data) that may be transmitted from phased antenna array 104 when mobile communications device 102 is used to communicate with a second communications device. Communications signal 116 may be transmitted in a direction or multiple directions (which may include omnidirectional), frequency, and power, as selectively configured by transceiver and phased antenna array 104.

Object determiner 106 is configured to detect objects in communication space 100. One or more objects may be positioned in communication space 100, such as one or more of first object 110 and second object 112, as well as further objects. Objects may be present of any type. For instance, in the example of FIG. 1, first object 110 may be a human, or portion thereof, such as the hand of a human, a head of a human, etc. Furthermore, in the example of FIG. 1, second object 112 is sheet of metal.

Objects, such as objects 110 and 112, in communications space 100 may absorb, pass, and/or reflect communications signal 116 transmitted from mobile communications device 102 to other devices. Object 110, which is a human or portion thereof, may absorb a substantial amount of the RF energy of communication signal 116, which could cause harm. Accordingly, mobile communications device 102 is configured to scan for objects with beam-shaped signal 114 transmitted by phased antenna array 104, and object determiner 106 is configured to analyze information received by transceiver 108 in response to the beam transmission (e.g., receive a reflection signal, receive a communications signal from a second communications device that received an attenuated version of beam-shaped signal 114, etc.). Based on the received information, object determiner 106 is configured to determine whether an object detected in communication space 100, such as first object 110, is a human, and if so, to modify communication signal 116 to reduce or eliminate harm. For instance, if the object is particularly close to phased antenna array 104 (e.g., within a predetermined distance), if the object appears to be a human (or portion thereof), and/or under further predetermined circumstances related to the object, communication signal 116 may be modified.

In embodiments, mobile communications device 102 may operate individually to scan for, detect, and analyze objects, or may operate in concert with one or more further communications devices to scan for, detect, and analyze objects.

Figure 2:
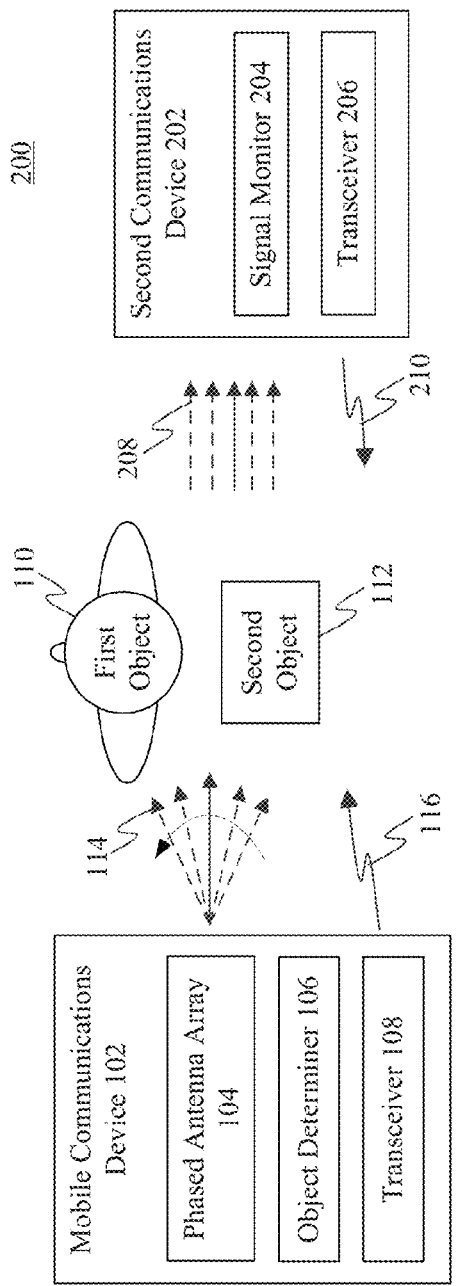
FIG. 2 shows a block diagram example of the communication space of FIG. 1, where a second communications device is present in the space to receive attenuated signals that were transmitted by the mobile communications device, according to an embodiment.

For instance, FIG. 2 shows a block diagram example of a communication space 200, where mobile communications device 102 communicates with a second communications device 202 to detect and analyze objects, according to an embodiment. As shown in FIG. 2, mobile communications device 102 includes phased antenna array 104, object determiner 106, and transceiver 108, and second communications device 202 includes a signal monitor 204 and a transceiver 206. Second communications device 202 may be any mobile (e.g., a cell phone, a laptop computer, a wearable computing device, etc.) or stationary (e.g., a personal computer, an access point, etc.) communications device disclosed herein or otherwise known.

As described above, phased antenna array 104 transmits a beam-shaped signal 114 to scan communications space 200 (e.g., scanning over a hemisphere/half-sphere space, a full sphere, or any portion thereof that includes movement of the beam over a distance). An area over which phased antenna array 104 is capable of scanning may be a function of the physical configuration of phased antenna array 104. For example, when phased antenna array 104 is implemented in a semiconductor chip, and/or has a metal back plane, phased antenna array 104 may be blocked from scanning through the back side of the chip or through the metal back plane, limiting phased antenna array 104 to scanning over a half-sphere.

In the embodiment of FIG. 2, second communications device 202 receives at least a portion of beam-shaped signal 114 as attenuated signal 208. For instance, an antenna coupled to transceiver 206 may receive attenuated signal 208, and transceiver 206 may be configured to demodulate (if modulated) and down-convert attenuated signal 208. Signal monitor 204 is configured to analyze attenuated signal 208 to determine information that may be used to detect objects, and to determine an identity of the objects, in communication space 200. For instance, beam-shaped signal 114 may pass through first and/or second object 110 and 114, while being attenuated thereby, to be received at second communications device 202. Signal monitor 204 may record a detected signal power of attenuated signal 208 (e.g., an amplitude), a phase of attenuated signal 208, and/or further information regarding attenuated signal 208. For instance, signal monitor 204 may record a time at which attenuated signal 208 is received. Attenuated signal 208 may contain a time stamp that indicates a time at which the corresponding beam of beam-shaped signal 114 was transmitted from mobile communications device 102. The recorded time may be compared to the time stamp by signal monitor 204 (or object determiner 106) to determine a distance between mobile communications device 102 and second communications device 202 (i.e., the time difference multiplied by the speed of light). This information may be transmitted by transceiver 206 in a communication signal 210 that is received by transceiver 108 at mobile communications device 102.

Object determiner 106 at mobile communications device 102 may process the received information to determine the presence of one or more objects between mobile communications device 102 and second communications device 202. Object determiner 106 may make one or more determinations used to indicate and identity of the object(s).

For example, object determiner 106 may determine a difference between a transmitted power of beam-shaped signal 114 and the received power of corresponding attenuated signal 208 (as indicated in the received information) to determine a path loss. Object determiner 106 may also determine a distance between mobile communications device 102 and second communications device 202 as described above (e.g., by comparing time stamps). Based on the determined path loss, and taking into account (e.g., subtracting) a portion of the path loss due to the ambient air over the determined distance (e.g., a predetermined path loss per distance for air multiplied by the determined distance), object determiner 106 may determine the amount of power absorbed by an object. The determined absorbed power may be compared by object determiner 106 to a stored table of objects/materials, which indicates a predetermined absorbed power for each of a plurality of objects/materials, to determine an identity of the object. The table may list predetermined absorbed power values for any number of objects/materials, such as human, human hand, human head, metal, wood, wooden table top, a wall (e.g., dry wall materials, wooden framing, etc.), leather, leather chair, etc. (e.g., common objects in places where mobile communications device 102 may be used). If object determiner 106 determines that an object, such as first object 110, is a human, object determiner 106 may cause communication signal 116 transmitted by phased antenna array 104 (and/or by another antenna of device 102) to be modified.

Additionally or alternatively, object determiner 106 may determine an identity of an object by determining a shape of the object. For example, in an embodiment, beam-shaped signal 114 may be transmitted by phased antenna array 104 to scan all possible paths (e.g., directing beam-shaped signal 114 over a continuous path, a plurality of separate paths, or at a sequence of discrete positions) in all or a portion of communication space 200 (e.g., a spherical area, a hemispherical area, etc.). Positions in communication space 200 where objects are positioned will modify beam-shaped signal 114 (e.g., by absorption, reflection, etc.), and the attenuated signals may be received by second communications device 202 as attenuated signal 208. Positions in communication space 200 where there are no objects positioned will cause little modification to beam-shaped signal 114. As such, second communications device 202 receives little or no attenuated signal 208 when beam-shaped signal 114 is directed to those positions, unless the direction of beam-shaped signal 114 is substantially in line with second communications device 202, in which case attenuated signal 208 is received little attenuated. In communication signal 210, second communications device 202 may transmit indications of the received signal powers corresponding to all of the positions in communication space 200. Mobile communications device 102 receives communication signal 210, and based on the received power information, object determiner 106 may be configured to construct a map of path loss for communication space 200. The map may be used to determine whether one or more objects is/are present.

The map may show the actual outline of one or more objects located in communication space 200. This is because received power values for positions where beam-shaped signal 114 strikes an object will be different from the received power values for positions where beam-shaped signal 114 does not strike the object. Accordingly, a contiguous set of received power values having similar values may form an object shape in communication space 200. A library of object shapes for known objects (e.g., humans, furniture, etc.) may be stored by mobile communications device 102, and a contiguous set of received power values corresponding to a detected shape may be compared to the object shapes in the library to determine the identity of the object.

Additionally, because the relative size that an object appears to mobile communications device 102 in communication space 200 corresponds to the distance to and the absolute size of the object, object determiner 106 can perform an estimation of the distance to the object by assuming a size of the object. As such, using the distance and directional information obtained from the scan by beam-shaped signal 114, a nearby object can be detected and a location of the object relative to mobile communications device 102 can be determined. This relative location can be used for one more purposes, such modifying a transmission power of communication signal 116, redirecting communication signal 116 so that is does not pass through the detected object, or other purpose.

Figure 3:
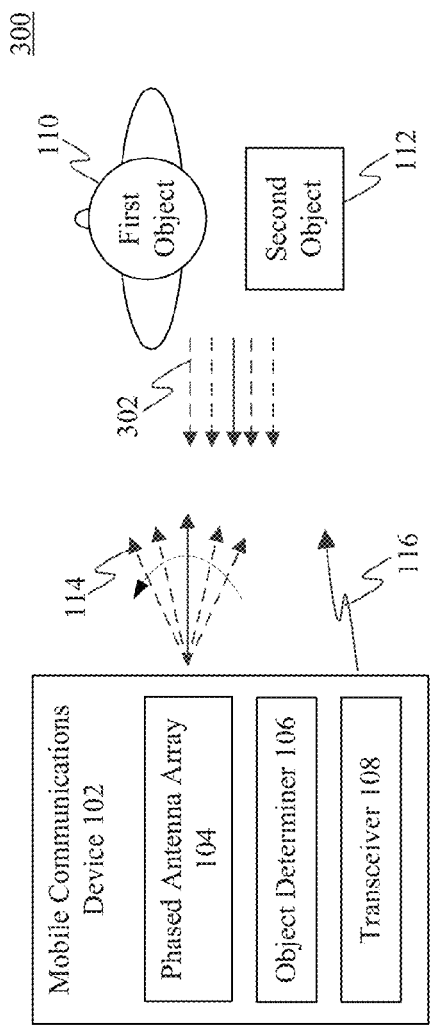
FIG. 3 shows a block diagram example of the communication space of FIG. 1, where the mobile communications device receives attenuated reflections of its own transmitted signals, according to an embodiment.

In another embodiment, FIG. 3 shows a block diagram example of a communication space 300, where mobile communications device 102 receives attenuated reflections of its own transmitted signals, and uses the received reflected signal to identify objects. As shown in FIG. 3, mobile communications device 102 includes phased antenna array 104, object determiner 106, and transceiver 108.

As described above, phased antenna array 104 transmits a beam-shaped signal 114 to scan communications space 200 (e.g., scanning over a hemisphere/half-sphere space, a full sphere, or any portion thereof that includes movement of the beam over a distance). Mobile communications device 102 receives reflections of the scanning beam-shaped signal 114 from objects as attenuated signal 302. For instance, phased antenna array 104 coupled to transceiver 108 may receive attenuated signal 302, and transceiver 108 may be configured to demodulate (if modulated) and down-convert attenuated signal 302. Object determiner 106 may analyze attenuated signal 302 to determine the identity of one or more objects in communication space 300.

For example, object determiner 106 may record a time at which attenuated signal 302 is received. Attenuated signal 302 may contain a time stamp that indicates a time at which the corresponding beam of beam-shaped signal 114 was transmitted from mobile communications device 102. The recorded time may be compared to the time stamp by object determiner 106 to determine a distance between mobile communications device 102 and the object (i.e., the time difference divided by two, multiplied by the speed of light). Furthermore, object determiner 106 may record a reflected signal power of attenuated signal 302 (e.g., an amplitude), as determined by transceiver 108, a phase of attenuated signal 302, and/or further information regarding attenuated signal 302.

Object determiner 106 at mobile communications device 102 may process this information (e.g., distance to object, reflected signal power, reflected signal phase, etc.) to determine the identity of one or more objects near mobile communications device 102 in communication space 300. Object determiner 106 may make one or more determinations used to indicate and identity of the object(s).

For example, similar to the description provided above, object determiner 106 may compare a transmitted power of beam-shaped signal 114 to the received power of attenuated signal 302 to determine a reflected signal power. Object determiner 106 may also determine a distance between mobile communications device 102 and an object as described above (e.g., by comparing time stamps). Based on the reflected signal power, and optionally taking into account (e.g., subtracting) a portion of a path loss due to the ambient air over the determined distance (e.g., a predetermined path loss per distance for air multiplied by the back and forth distance), object determiner 106 may determine the amount of power absorbed by an object. As described above, the determined absorbed power may be compared by object determiner 106 to a stored table of objects/materials, which indicates a predetermined absorbed power for each of a plurality of objects/materials, to determine an identity of the object. If object determiner 106 determines that an object, such as first object 110, is a human, object determiner 106 may cause a power of communication signal 116 transmitted by phased antenna array 104 (or other antenna of device 102) to be reduced.

Additionally or alternatively, as described above, object determiner 106 may determine an identity of an object by determining a shape of the object. For example, in an embodiment, beam-shaped signal 114 may be transmitted by phased antenna array 104 to scan all possible paths in all or a portion of communication space 300. Positions in communication space 300 where objects are positioned will reflect beam-shaped signal 114, and the reflected signals may be received by mobile communications device 102 as attenuated signal 302. Positions in communication space 200 where there are no objects positioned will not reflect beam-shaped signal 114. As such, mobile communications device 102 receives little or no attenuated signal 302 when beam-shaped signal 114 is directed to those positions. In an embodiment, object determiner 106 may be configured to construct a map of reflected power for communication space 200. The map may be used to determine whether one or more objects is/are present.

For example, the map may show the actual outline of an object located in communication space 300. This is because the reflected power values for positions where beam-shaped signal 114 strikes an object will be greater than the reflected power values for positions where beam-shaped signal 114 does not strike the object. Furthermore, some materials (e.g., metal) are more reflective than others (e.g., human flesh), which can aid in distinguishing between object types.

For instance, as described above, the directivity and amount of reflection of energy from an object may be determined based on a material from which the object is made, the shape of the object, and a surface roughness of the object. A frequency of the transmitted signal also may change the reflection percentage and directivity, and thus may be taken into account. Thus, phased antenna array 104 may perform a beam scan, and phased antenna array 104 may receive and detect the energy of the reflected signal. The power measured by one or more receivers (e.g., transceiver 108) is a function of the distance to the object, the reflection directivity of the object, and a percentage of energy that is reflected. For example, a smooth metallic object tends to reflect a large percentage of the energy of a received narrow beam in a narrow reflected beam that causes a small spot of reflected energy. The size of the reflected spot of energy will tend to be smaller for a closer object and larger for a farther away object. Additionally, the total power that is received at the mobile device will tend to be greater for a close object due to air losses having less effect relative to a further away object. Objects such as human hands will tend to not reflect much energy, and any such reflected energy will tend to be spread over a large area due to surface roughness (of skin) and poorer conductivity, while objects like paper will not reflect much at all, but will tend to absorb the received energy.

Accordingly, a contiguous set of received reflected power values having similar values may indicate a shape of a particular object in communication space 300. A library of object shapes for known objects (e.g., humans, furniture, etc.) may be stored by mobile communications device 102, and a contiguous set of received reflected power values corresponding to a detected shape may be compared to the object shapes in the library to determine the identity of the object. Furthermore, differently shaped materials may have different reflection characteristics. For instance, an object with a flat surface, such as a sheet of metal or a surface of a table or wall, may reflect radiation relatively uniformly (e.g., in a same direction; at a same angle) for a plurality of beam instances transmitted into the surface when scanning the space, which may indicate the object as being non-human, while a non-flat surface, including the skin of a human body, hand, etc., may reflect radiation relatively non-uniformly over an area of the space (e.g., in numerous directions; different angles), which may be a criteria used to indicate that object as being possibly human.

Additionally, as described above, because the relative size that an object appears to mobile communications device 102 in communication space 200 corresponds to the distance to and the absolute size of the object, object determiner 106 can perform an estimation of the distance to the object by assuming a size of the object. As such, using the distance and directional information obtained from the scan by beam-shaped signal 114, a nearby object (having a relatively larger angular size) can be detected and a location of the object relative to mobile communications device 102 can be determined. This relative location can be used for one more purposes, such modifying a transmission power of communication signal 116, redirecting communication signal 116 so that is does not pass through the detected object, or other purpose.

Figure 4:
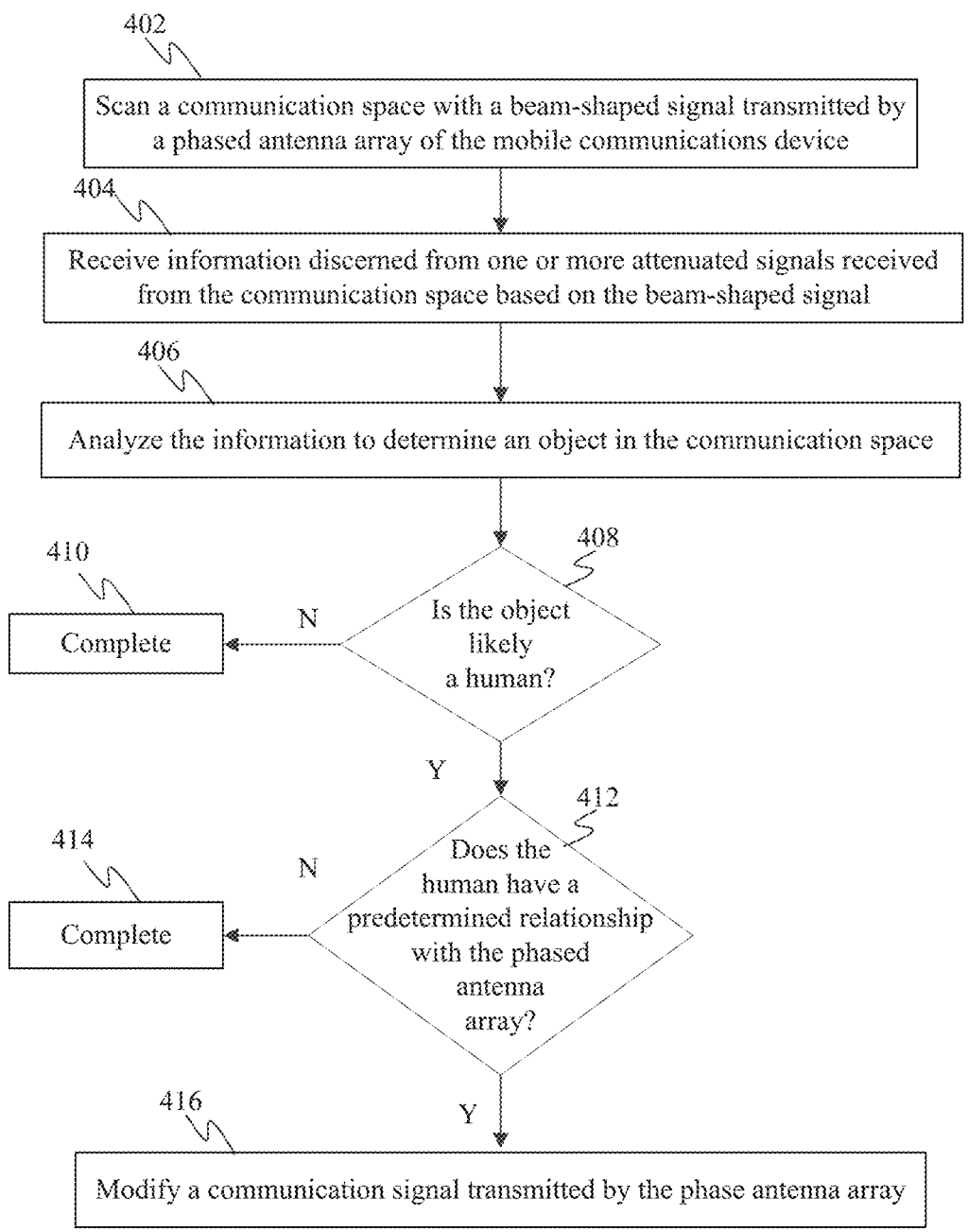
FIG. 4 shows a flowchart providing a process in a mobile communications device for detecting objects in a communication space and modifying communication signals in accordance with such detections, according to an example embodiment.
Figure 5:
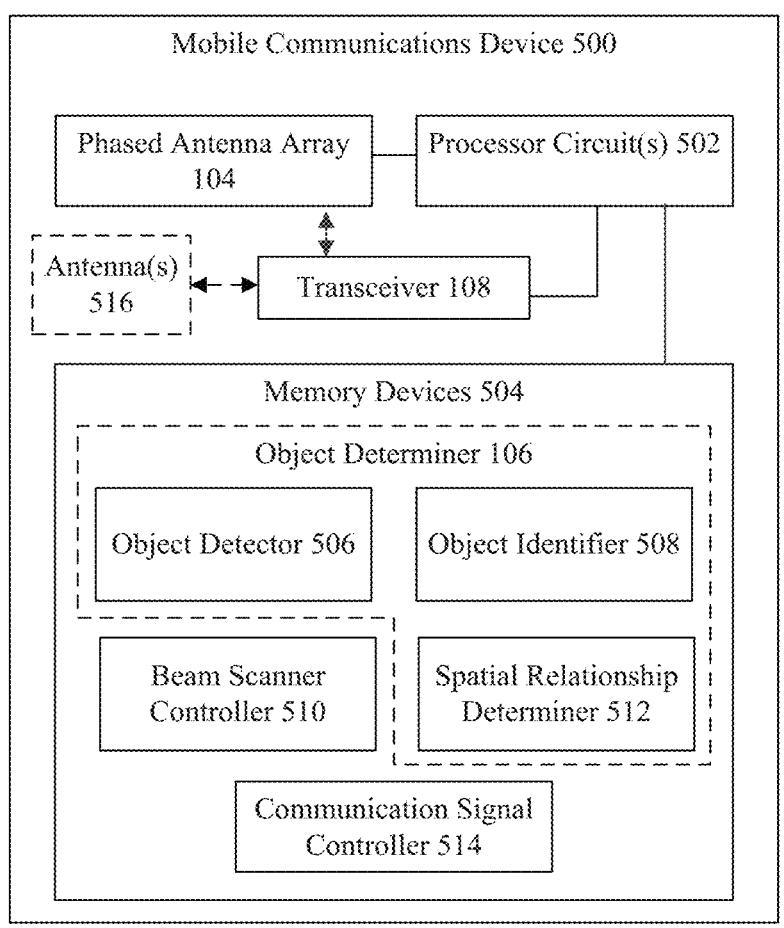
FIG. 5 shows a block diagram of a mobile communications device configured to detect objects in a communication space and modify communication signals in accordance with such detections, according to an example embodiment.

In embodiments, the mobile communications devices of FIGS. 1-3 may be configured in various ways to detect and identify objects in a communication space. For instance, FIG. 4 shows a flowchart 400 providing a process in a mobile communications device for detecting objects in a communication space and modifying communication signals in accordance with such detections, according to an example embodiment. The mobile communications devices of FIGS. 1-3 may operate according to flowchart 400, in embodiments. For illustrative purposes, flowchart 400 is described below with reference to FIGS. 1-3 and FIG. 5. FIG. 5 shows a block diagram of a mobile communications device 500 configured to detect objects in a communication space and modify communication signals in accordance with such detections, according to an example embodiment. Mobile communications device 500 is an example of mobile communications device 102. As shown in FIG. 5, mobile communications device 500 includes phased antenna array 104, transceiver 108, one or more processor circuits 502, one or more memory devices 504, and one or more optional additional antennas 516. Memory device(s) 504 store object determiner 106, a beam scanner controller 510, and a communication signal controller 514 (e.g., as program code). Object determiner 106 includes an object detector 506, an object identifier 508, and a spatial relationship determiner 512. Object detector 506, object identifier 508, beam scanner controller 510, spatial relationship determiner 512, and communication signal controller 514 may each be executed by processor circuit(s) 502 to perform as described herein. Flowchart 400 is described with respect to FIGS. 1-3 and 5 as follows. It is noted that the steps of flowchart 400 do not necessarily have to occur in the order shown in FIG. 4, but may occur in other orders.

Flowchart 400 of FIG. 4 begins with step 402. In step 402, a communication space is scanned with a beam-shaped signal transmitted by a phased antenna array of the mobile communications device. For example, as described above, phased antenna array 104 may transmit a beam-shaped signal 114 (FIGS. 1-3). As indicated by the dotted straight-line arrows, beam-shaped signal 114 may be steered into multiple different directions, the steering of which is indicated by the curved, dotted arrow. In an embodiment, the pattern over which beam-shaped signal 114 is steered is controlled by beam scanner controller 510 (FIG. 5). Beam scanner controller 510 may be executed by processor circuit(s) 502 to generate control signals to control the antennas of phased antenna array 104 (FIGS. 1-3 and 5). For example, in an embodiment, beam scanner controller 510 may generate control signals that configure the relative phases of the RF signals (in transceiver 108 and/or directly in phased antenna array 104) that are fed to the antennas of phased antenna array 104 so that the radiation pattern of phased antenna array 104 in its entirety is focused into a beam shape. The beam itself may have a round, rectangular, square, or other shaped cross-section with any suitable dimensions, such as covering a two-by-two degree area, a one-by-one degree area, a fraction of a degree area, etc.

Furthermore, beam scanner controller 510 modifies the control signals to cause the beam to sweep throughout the communication space. For instance, the beam may be controlled to be always on during the sweeping, and may be swept back and forth across the communication space, from one side to the other, to cover the entire communication space with a continuous beam. Alternatively, the beam may be pointed to a particular location, turned on, turned off, moved to a next location, turned on, turned off, etc. to cover the entire the communication space with a plurality of discrete beams.

In this manner, an RF beam-shaped signal is generated to scan the communication space. Operation proceeds from step 402 to step 404.

In step 404, information is discerned from one or more attenuated signals received from the communication space based on the beam-shaped signal. As described above, information that may be used by object determiner 106 (FIGS. 1-3 and 5) to determine the presence of an object is obtained from attenuated signals received in the communication space (attenuated versions of beam-shaped signal 114), such as a received power, a received signal phase, a received signal time, etc. Such information may be obtained directly from attenuated reflected signals received at mobile communications device 500, or may be obtained from attenuated signals received at a second communications device, which in turn passes the information to mobile communications device 500. Operation proceeds from step 404 to step 406.

In step 406, the information is analyzed to determine an object in the communication space. As described above, object determiner 106 may analyze the information, along with other information such as transmitted power, transmitted signal phase, signal transmit time, etc., to determine one or more objects in a communication space. During the analysis, object determiner 106 may determine one or more metrics regarding an object, including a distance to the object, an amount of absorbed and/or reflected power by the object, etc.

Steps 404 and 406 may be performed by mobile communications device 500 (FIG. 5) in various ways in one-device (e.g., FIG. 3) and two-device (e.g., FIG. 2) embodiments.

Figure 6:
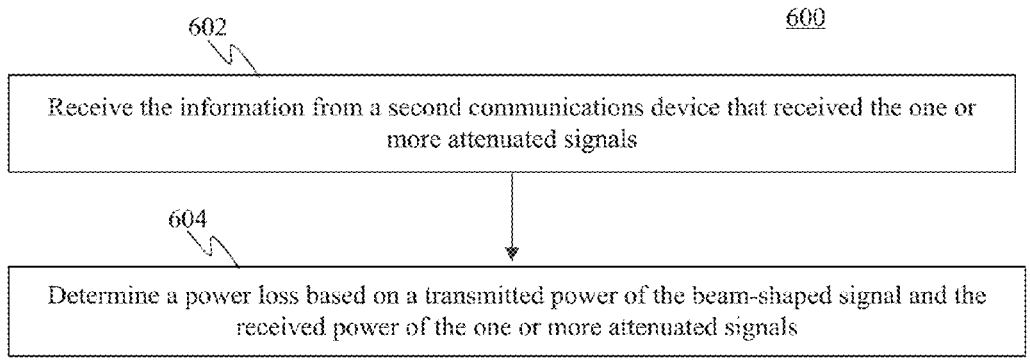
FIG. 6 shows a flowchart providing a process in a mobile communications device for determining a signal power loss based on signals received by a second communications device, according to an example embodiment.

For example, FIG. 6 shows a flowchart 600 providing a process in a mobile communications device for determining a signal power loss based on signals received by a second communications device, according to an example embodiment. Flowchart 600 is described as follows.

In step 602, the information is received from a second communications device that received the one or more attenuated signals. For example, with reference to FIG. 2, information, such as a received power, a received signal phase, a received signal time, etc., may be determined from attenuated signal 208 received at second communications device 202, and transmitted in communication signal 210 by transceiver 206 of second communications device 202. Communication signal 210 is received by transceiver 108 at mobile communications device 102 via phased antenna array 104 or by another antenna of mobile communications device 102, such as antenna(s) 516. Examples of antenna(s) 516 include antennas used for Wi-Fi communications, for cellular communications, for near field communications (NFC), etc. Communication signal 210 may be transmitted and received according to any protocol or standard technique, or accordingly to a proprietary communication technique. For example, mobile communications device 102 and second communications device 202 may each include a communication/network interface (in transceiver 108 or 206, respectively) that enables communications over a network. Examples of such communication/network interfaces, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc.

In step 604, a power loss is determined based on a transmitted power of the beam-shaped signal and the received power of the one or more attenuated signals. In an embodiment, object detector 506 (FIG. 5) of object determiner 106 is configured to analyze the information received from second communications device 202 along with other information related to beam-shaped signal 114 such as transmitted power, transmitted signal phase, signal transmit time, etc., to determine one or more objects in a communication space. Object detector 506 may determine one or more metrics regarding a prospective object from the analysis, including a distance to the prospective object, an amount of absorbed power and/or passed power by the prospective object, etc. Examples for making such determinations are described elsewhere herein. Object detector 506 may compare the determined metrics to predetermined threshold metrics for present objects to determine that one or more objects are likely to be present in the communication space. For example, object detector 506 may compare a determined path loss to a predetermined threshold path loss value that indicates an object is present (that absorbed an amount of power greater than the threshold value). Object detector 506 may perform additional or alternative comparisons and/or analysis to determine the presence of objects, as described elsewhere herein, and/or as would be apparent to persons skilled in the relevant art(s) from the teachings herein.

Figure 7:
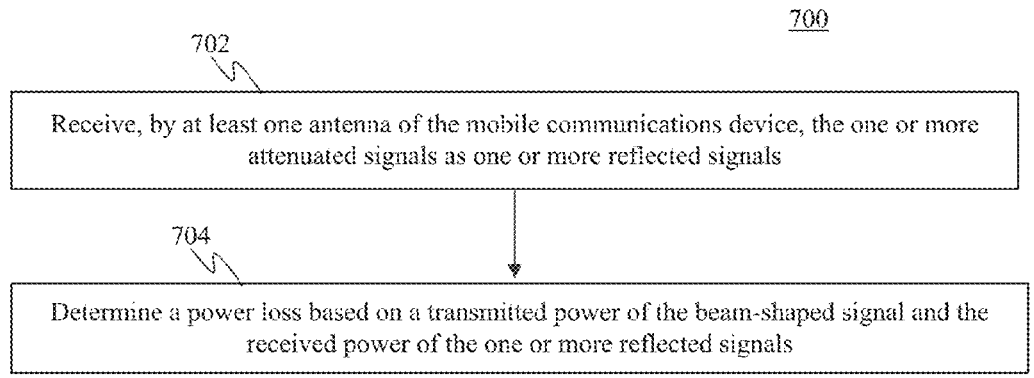
FIG. 7 shows a flowchart providing a process in a mobile communications device for determining a signal power loss based on reflected signals received by the mobile communications device, according to an example embodiment.

In another example, FIG. 7 shows a flowchart 700 providing a process in a mobile communications device for determining a signal power loss based on reflected signals received by the mobile communications device, according to an example embodiment. Flowchart 700 is described as follows.

In step 702, the one or more attenuated signals are received as one or more reflected signals by at least one antenna of the mobile communications device. For example, as described above, mobile communications device 102 (FIG. 3) may receive attenuated signals 302, which are reflections of the transmitted beam-shaped signal 114. The signal reflections are due to objects in the communication space. Attenuated signals 302 may be received by transceiver 108 via phased antenna array 104, or by another antenna that may be present in mobile communications device 500, such as antenna(s) 516.

In step 704, a power loss is determined based on a difference between a transmitted power of the beam-shaped signal and the received power of the one or more reflected signals. In an embodiment, object detector 506 (FIG. 5) is configured to analyze attenuated signal 302 (FIG. 3) to determine information including one or more of a reflected received power, a received signal phase, a received signal time, etc. Object detector 506 may analyze the determined information along with other information related to transmitted beam-shaped signal 114 such as transmitted power, transmitted signal phase, signal transmit time, etc., to determine one or more metrics regarding a prospective object, including a distance to the prospective object, an amount of absorbed and/or reflected power by the prospective object, etc. Examples for making such determinations are described elsewhere herein. Object detector 506 may compare the determined metrics to predetermined threshold metrics for present objects to determine that one or more objects are likely to be present in the communication space. Object detector 506 may compare a determined path loss to a predetermined threshold path loss value that indicates an object is present (that absorbed an amount of power greater than the threshold value). Object detector 506 may compare a determined absorbed power (e.g., transmitted power minus reflected power) to a predetermined threshold absorbed power that indicates an object is present (that absorbed an amount of power greater than the threshold value). Object detector 506 may perform additional or alternative comparisons and/or analysis to determine the presence of objects, as described elsewhere herein, and/or as would be apparent to persons skilled in the relevant art(s) from the teachings herein.

Accordingly, in one-device (e.g., FIG. 3) or multi-device (e.g., FIG. 2) embodiments, object determiner 106, including object detector 506, may be configured to determine one or more objects in a communication space. Object detector 506 is configured to analyze an attenuated signal to determine signal attributes such as received signal power, phase, time, etc. Object detector 506 is configured to use the attenuated signal attributes, in conjunction with transmitted beam-shaped signal attributes (e.g., transmitted signal power, phase, time, etc.), to determine whether one or more objects are present. For instance, when a path loss (e.g., FIG. 2) is greater than an amount expected for ambient air, or a reflected power has a greater value than expected (relative to an empty location, which would have little or no reflection), object detector 506 may determine that one or more objects are present.

Referring back to flowchart 400 of FIG. 4, operation proceeds from step 406 to step 408.

Figure 8:
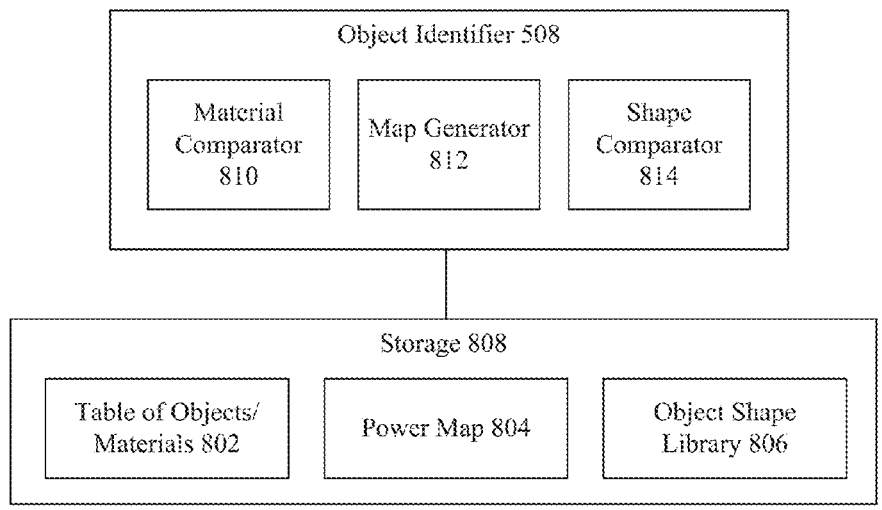
FIG. 8 shows a block diagram of an object identifier configured to access one or more tables, maps, or libraries that aid in object identification, according to example embodiments.

In step 408, whether the object is likely to be a human is determined. In an embodiment, object identifier 508 (FIG. 5) is configured to determine whether an object detected by object detector 506 is likely to be a human. Object identifier 508 may be configured in various ways to make such an identification. For example, FIG. 8 shows a block diagram of object identifier 508 configured to access one or more tables, maps, or libraries to identify objects, according to example embodiments. As shown in FIG. 8, object identifier 508 includes a material comparator 810, a map generator 812, and a shape comparator 814. In embodiments, object identifier 508 may include any one or more of these components. Furthermore, object identifier 508 of FIG. 8 is coupled to storage 808 of mobile communications device 102. Storage 808 is comprises of one or more of any type of storage mechanism, including a magnetic disc (e.g., in a hard disk drive), an optical disc (e.g., in an optical disk drive), a memory device such as a RAM device, a ROM device, etc., and/or any other suitable type of storage medium. As shown in FIG. 8, storage 808 includes a table of objects/materials 802, a power map 804, and an object shape library 806. Object identifier 508 of FIG. 8 is described as follows.

In an embodiment, material comparator 810 of object identifier 508 may receive an indication of the amount of power absorbed by a prospective object, as determined by object detector 506. The determined absorbed power may be compared by material comparator 810 to table of objects/materials 802, which indicates a predetermined absorbed power for each of a plurality of objects/materials, to determine an identity of the object. Table 802 may list predetermined absorbed power values (or reflected power values) for any number of objects/materials, such as human, human hand, human head, metal, wood, wooden table top, leather, leather chair, etc. (e.g., common objects in places where mobile communications device 102 may be used). If material comparator 810 determines that the absorbed power (or reflected power) of the material of the object substantially matches that of a human, material comparator 810 indicates that the object is likely to be a human. If the absorbed power of the material of the object does not substantially match that of a human, material comparator 810 indicates that the object is not likely to be a human.

Figure 9A:
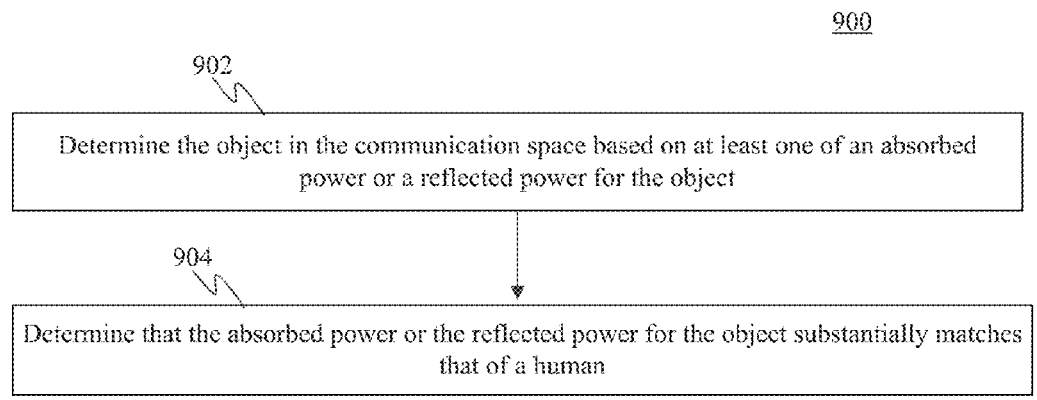
FIGS. 9A and 9B show flowcharts providing processes in a mobile communications device for identifying an object as a human, according to example embodiments.

Accordingly, object determiner 106 of FIG. 5 may operate according to FIG. 9A, in an embodiment. FIG. 9A shows a flowchart 900 providing a process in a mobile communications device for identifying an object as a human based on absorbed power/reflected power, according to an example embodiment. Flowchart 900 is described as follows.

In step 902, the object is determined in the communication space based on at least one of an absorbed power or a reflected power for the object. As described above, object detector 506 may determine the presence of an object in a communication space based on an absorbed power determined for the object, or a reflected power determined for the object, when compared to the transmitted power of the beam-shaped signal.

In step 904, the absorbed power or the reflected power for the object is determined to substantially match that of a human. As described above, material comparator 810 of object identifier 508 may compare the absorbed power or reflected power for the object to entries in table of objects/materials 802 to determine a likely object type for the object. If the absorbed power or reflected power matches the corresponding value for a human, the object is likely to be a human.

Additionally or alternatively, object identifier 508 of FIG. 8 may determine an identity of an object by determining a shape of the object. For example, in an embodiment, beam-shaped signal 114 may be transmitted by phased antenna array 104 to scan all possible paths (e.g., directing beam-shaped signal 114 over a continuous path, a plurality of separate paths, or at a sequence of discrete positions) in all or a portion of communication space 200 (e.g., a spherical area, a hemispherical area, etc.). Positions in communication space 200 where objects are positioned will modify beam-shaped signal 114 (e.g., by absorption, reflection, etc.), and the attenuated signals may be received by second communications device 202 as attenuated signal 208. Positions in communication space 200 where there are no objects positioned will cause little modification to beam-shaped signal 114. As such, second communications device 202 receives little or no attenuated signal 208 when beam-shaped signal 114 is directed to those positions, unless the direction of beam-shaped signal 114 to substantially in line with second communications device 202. In communication signal 210, second communications device 202 may transmit indications of the received signal powers corresponding to all of the positions in communication space 200 for which an attenuated signal is received. Mobile communications device 102 receives communication signal 210, and based on the received power information, map generator 812 is configured to construct power map 804 as a map of path loss for communication space 200. Power map 804 be used to determine whether one or more objects is/are present.

In a similar manner, beam-shaped signal 114 may be transmitted by phased antenna array 104 to scan all possible paths in communication space 300 of FIG. 3, and signals reflected from objects in space 300 may be received at mobile communications device 102 as attenuated signal 302. Positions in communication space 300 where there are objects will cause signal reflections, while positions where no objects are located will cause little to no reflected signals. Based on the received power information, map generator 812 is configured to construct power map 804 as a map of absorbed (or reflected) power for communication space 300. Power map 804 may be used to determine whether one or more objects is/are present.

For example, power map 804 may show the actual outline of an object located in communication space 200 or 300. This is because received power values for positions where beam-shaped signal 114 strikes an object will be different from the received power values for positions where beam-shaped signal 114 does not strike the object. Accordingly, a contiguous set of received power values having similar values may form an object shape in communication space 200 or 300. As shown in FIG. 8, an object shape library 806 for known objects (e.g., humans, furniture, etc.) may be stored in storage 808, and a contiguous set of received power values corresponding to a detected shape may be compared by shape comparator 814 to the object shapes in object shape library 806 to determine the identity of the object. If the detected object shape substantially matches the shape of a human, or portion thereof, in object shape library 806 (e.g., a human hand, a human head, a human ear, a full human, a human torso, etc.), shape comparator 814 indicates that the object is likely to be a human. If the detected object shape does not substantially match the shape of a human, or portion thereof, in object shape library 806, shape comparator 814 indicates that the object is not likely to be a human.

Figure 9B:
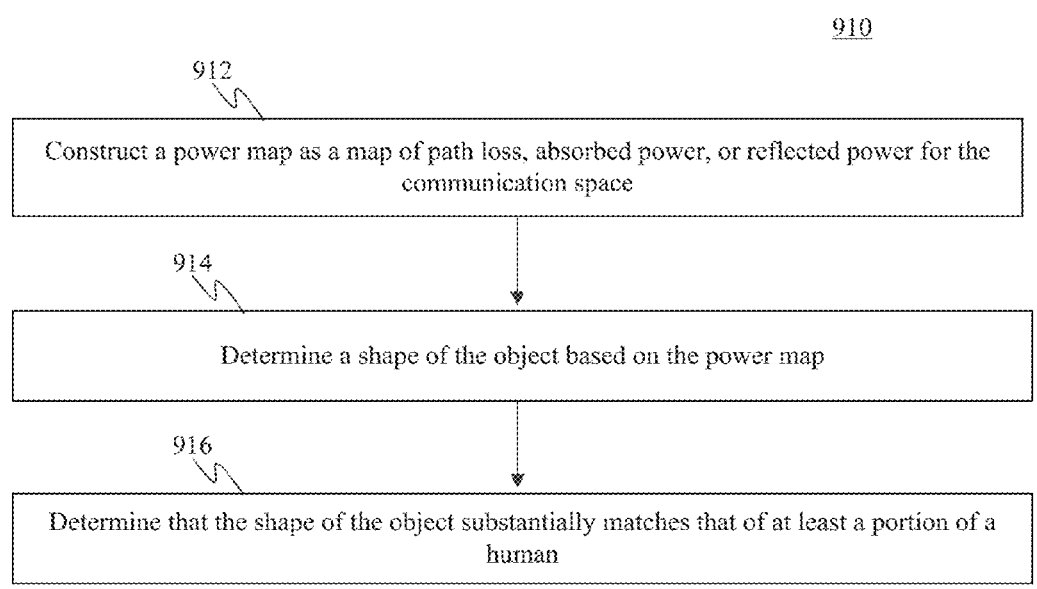

Accordingly, object determiner 106 of FIG. 5 may operate according to FIG. 9B, in an embodiment. FIG. 9B shows a flowchart 910 providing a process in a mobile communications device for identifying an object as a human based on shape, according to an example embodiment. Flowchart 910 is described as follows.

In step 912, a power map is constructed as a map of path loss, absorbed power, or reflected power for the communication space. As described above, map generator 812 of object identifier 508 may generate power map 804, as a map of path loss, absorbed power, or reflected power determined by scanning the communication space with a beam-shaped signal.

In step 914, a shape of the object is determined based on the power map. As described above, shape comparator 814 may determine one or more objects in the communication space based on an analysis of the communication space, such as by searching the power map for sets of contiguous coordinates with similar path loss, absorbed power, or reflected power values. Such a set of contiguous coordinates forms an object shape.

In step 916, the shape of the object is determined to substantially match that of at least a portion of a human. As described above, shape comparator 814 may compare a detected object shape to the object shapes in object shape library 806. If the detected object shape substantially matches the shape of a human, or portion thereof, in object shape library 806, shape comparator 814 indicates that the object is likely to be a human.

In embodiments, object detector 506 may be configured to use one or more of any criteria to detect whether an object is human or not, including by determining whether an amount of radiation absorbed or reflected by the object, and/or a path loss due to the object, matches those of the material of a human (organic material, human flesh characteristics, etc.), whether the object matches a shape of a human, whether the object reflects radiation non-uniformly like a human, etc.

Referring back to FIG. 4, if the object is determined to not likely be a human, operation proceeds from step 408 to step 410. If the object is determined to likely be a human, operation proceeds from step 408 to step 412.

In step 410, because the object is not likely to be a human, operation of flowchart 400 is complete.

In step 412, whether the human has a predetermined relationship with the phased antenna array is determined. In an embodiment, if the detected human has a predetermined relationship with phased antenna array 104, such as being within a predetermined distance (i.e., a range within which a human may receive an amount of radiation considered to be harmful for a current transmit power), it may be desired to take action. Accordingly, a distance from mobile communications device 102 determined for the human (e.g., as described above) may be compared by spatial relationship determiner 512 to a predetermined, stored distance (within which is considered harmful for a human for a current transmit power). If the human is determined to be within the range for a current transmit power, spatial relationship determiner 512 may provide an output signal indicating an action is to be taken.

In an embodiment, because the relative size that an object appears to mobile communications device 102 in communication space 200 or 300 corresponds to the distance to and the absolute size of the object, spatial relationship determiner 512 may be configured to perform an estimation of the distance to the object by assuming a size of the human, or portion thereof, from a shape of the human (or portion) determined by shape comparator 814. Again, if the human is determined to be within the predetermined, stored distance (considered harmful) for the current transmit power, spatial relationship determiner 512 may provide an output signal indicating an action is to be taken.

Referring back to FIG. 4, if the human does not have the predetermined relationship with the phased antenna array, operation proceeds from step 412 to step 414. If the human does have the predetermined relationship with the phased antenna array, operation proceeds from step 412 to step 416.

In step 414, because the human does not have the predetermined relationship with the phased antenna array, operation of flowchart 400 is complete.

In step 416, a communication signal transmitted by the phased antenna array is modified. In embodiments, various actions to modify communication signal 116 can be taken if the human is determined to have the predetermined relationship with the phased antenna array. For example, a transmission power of communication signal 116 may be modified (e.g., reduced or turned off), communication signal 116 may be steered in a direction so that is does not pass through the human, a frequency (e.g., carrier frequency) of communication signal 116 may be modified (which may alter the amount of radiation provided to the human by phased antenna array 104), and/or another modification to communication signal 116 may be made.

For example, spatial relationship determiner 512 (FIG. 5) may generate a control signal that is received by communications signal controller 514, to cause communications signal controller 514 to instruct transceiver 108 to modify communication signal 116 transmitted by phased antenna array 104 (or other antenna of device 102).

Of course, subsequent scans by the beam-shaped signal according to flowchart 400 may indicate that a detected human (or portion thereof), has been repositioned, and in such case the communication signal may again be modified accordingly. If the detected nearby human (or portion thereof) is no longer detected as being nearby in a subsequent scan, the communication signal may be reset to a prior setting (e.g., transmit power increased, beam direction turned back to where the human was located, etc.).

III. Example Mobile and Stationary Device Embodiments

Mobile communications device 102, object determiner 106, second communications device 202, signal monitor 204, object detector 506, object identifier 508, beam scanner controller 510, spatial relationship determiner 512, communication signal controller 514, material comparator 810, map generator 812, shape comparator 814, flowchart 400, flowchart 600, flowchart 700, flowchart 900, and flowchart 910 may be implemented in hardware, or hardware combined with software and/or firmware. For example, object determiner 106, signal monitor 204, object detector 506, object identifier 508, beam scanner controller 510, spatial relationship determiner 512, communication signal controller 514, material comparator 810, map generator 812, shape comparator 814, flowchart 400, flowchart 600, flowchart 700, flowchart 900, and/or flowchart 910 may be implemented as computer program code/instructions configured to be executed in one or more processors and stored in a computer readable storage medium. Alternatively, object determiner 106, signal monitor 204, object detector 506, object identifier 508, beam scanner controller 510, spatial relationship determiner 512, communication signal controller 514, material comparator 810, map generator 812, shape comparator 814, flowchart 400, flowchart 600, flowchart 700, flowchart 900, and/or flowchart 910 may be implemented as hardware logic/electrical circuitry.

For instance, in an embodiment, one or more, in any combination, of object determiner 106, object detector 506, object identifier 508, beam scanner controller 510, spatial relationship determiner 512, communication signal controller 514, material comparator 810, map generator 812, shape comparator 814, flowchart 400, flowchart 600, flowchart 700, flowchart 900, and/or flowchart 910 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
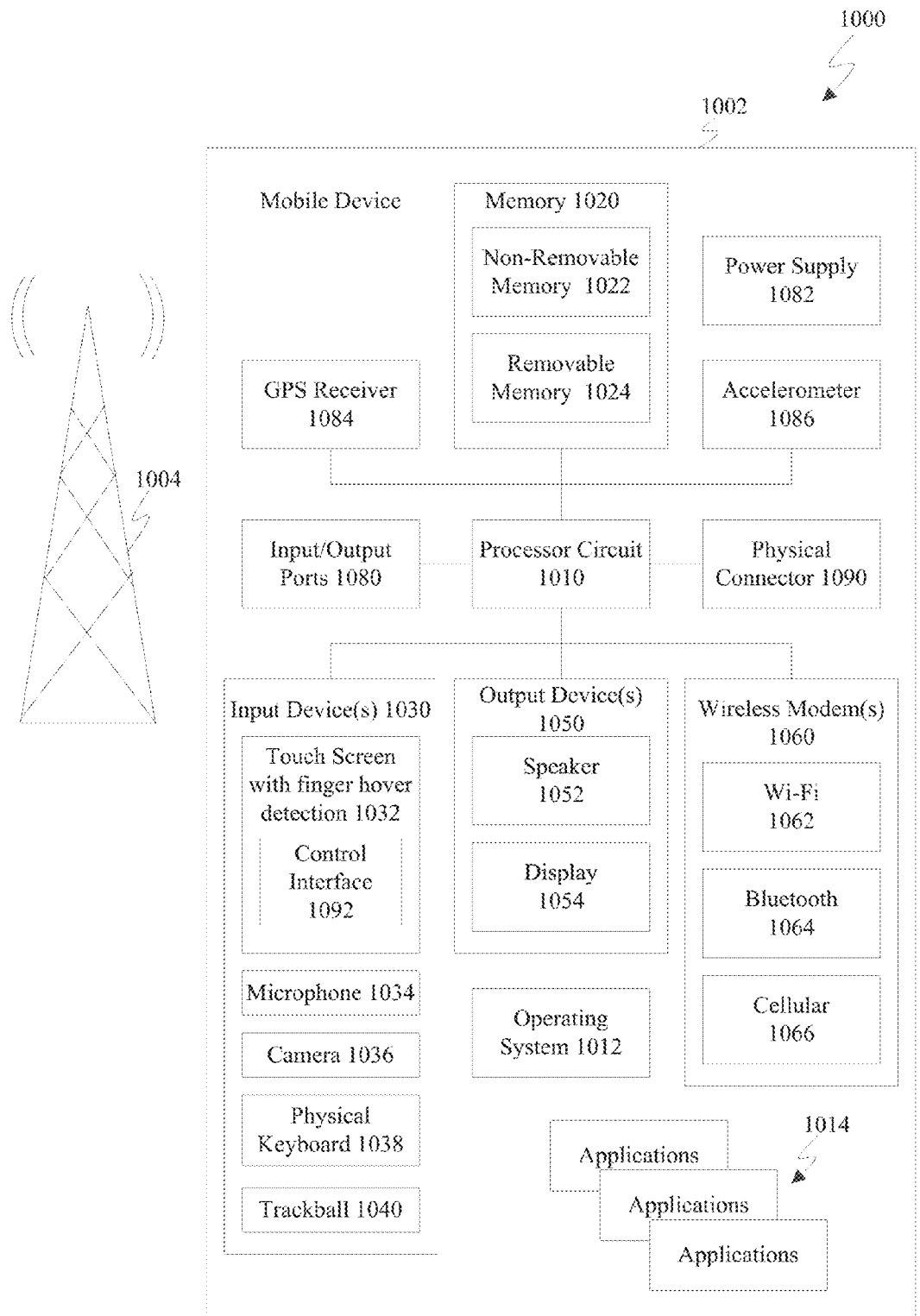
FIG. 10 shows a block diagram of an exemplary user device in which embodiments may be implemented.

FIG. 10 shows a block diagram of an exemplary mobile device 1000 including a variety of optional hardware and software components, shown generally as components 1002. For instance, components 1002 of mobile device 1000 are examples of components that may be included in mobile communications device 102 and/or second communications device 202 in mobile device embodiments. Any number and combination of the features/elements of components 1002 may be included in a mobile device embodiment, as well as additional and/or alternative features/elements, as would be known to persons skilled in the relevant art(s). It is noted that any of components 1002 can communicate with any other of components 1002, although not all connections are shown, for ease of illustration. Mobile device 1000 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1004, such as a cellular or satellite network, or with a local area or wide area network.

The illustrated mobile device 1000 can include a controller or processor referred to as processor circuit 1010 for performing such tasks as signal coding, image processing, data processing, input/output processing, power control, and/or other functions. Processor circuit 1010 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1010 may execute program code stored in a computer readable medium, such as program code of one or more applications 1014, operating system 1012, any program code stored in memory 1020, etc. Operating system 1012 can control the allocation and usage of the components 1002 and support for one or more application programs 1014 (a.k.a. applications, "apps", etc.). Application programs 1014 can include common mobile computing applications (e.g., email applications, calendars, contact managers, web browsers, messaging applications) and any other computing applications (e.g., word processing applications, mapping applications, media player applications).

As illustrated, mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. Memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1020. These programs include operating system 1012, one or more application programs 1014, and other program modules and program data. Examples of such application programs or program modules may include, for example, computer program logic (e.g., computer program code or instructions) for implementing object determiner 106, object detector 506, object identifier 508, beam scanner controller 510, spatial relationship determiner 512, communication signal controller 514, material comparator 810, map generator 812, shape comparator 814, flowchart 400, flowchart 600, flowchart 700, flowchart 900, and/or flowchart 910 (including any suitable step of flowcharts 400, 600, 700, 900, and/or 910), and/or further embodiments described herein.

Mobile device 1000 can support one or more input devices 1030, such as a touch screen 1032, microphone 1034, camera 1036, physical keyboard 1038 and/or trackball 1040 and one or more output devices 1050, such as a speaker 1052 and a display 1054. Touch screens, such as touch screen 1032, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1032 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The touch screen 1032 is shown to include a control interface 1092 for illustrative purposes. The control interface 1092 is configured to control content associated with a virtual element that is displayed on the touch screen 1032. In an example embodiment, the control interface 1092 is configured to control content that is provided by one or more of applications 1014. For instance, when a user of the mobile device 1000 utilizes an application, the control interface 1092 may be presented to the user on touch screen 1032 to enable the user to access controls that control such content. Presentation of the control interface 1092 may be based on (e.g., triggered by) detection of a motion within a designated distance from the touch screen 1032 or absence of such motion. Example embodiments for causing a control interface (e.g., control interface 1092) to be presented on a touch screen (e.g., touch screen 1032) based on a motion or absence thereof are described in greater detail below.

Other possible output devices (not shown) can include piezoelectric or other haptic output devices. Some devices can serve more than one input/output function. For example, touch screen 1032 and display 1054 can be combined in a single input/output device. The input devices 1030 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 can comprise speech-recognition software as part of a voice control interface that allows a user to operate the device 1000 via voice commands. Further, device 1000 can comprise input devices and software that allows for user interaction via a user's spatial gestures, such as detecting and interpreting gestures to provide input to a gaming application.

Wireless modem(s) 1060 can be coupled to antenna(s) (not shown) and can support two-way communications between processor circuit 1010 and external devices, as is well understood in the art. The modem(s) 1060 are shown generically and can include a cellular modem 1066 for communicating with the mobile communication network 1004 and/or other radio-based modems (e.g., Bluetooth 1064 and/or Wi-Fi 1062). Cellular modem 1066 may be configured to enable phone calls (and optionally transmit data) according to any suitable communication standard or technology, such as LTE (long term evolution), GSM, 3G, 4G, 5G, etc. At least one of the wireless modem(s) 1060 is typically configured for communication with one or more cellular networks, such as a GSM network for data and voice communications within a single cellular network, between cellular networks, or between the mobile device and a public switched telephone network (PSTN).

Mobile device 1000 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be not present and other components can be additionally present as would be recognized by one skilled in the art.

Figure 11:
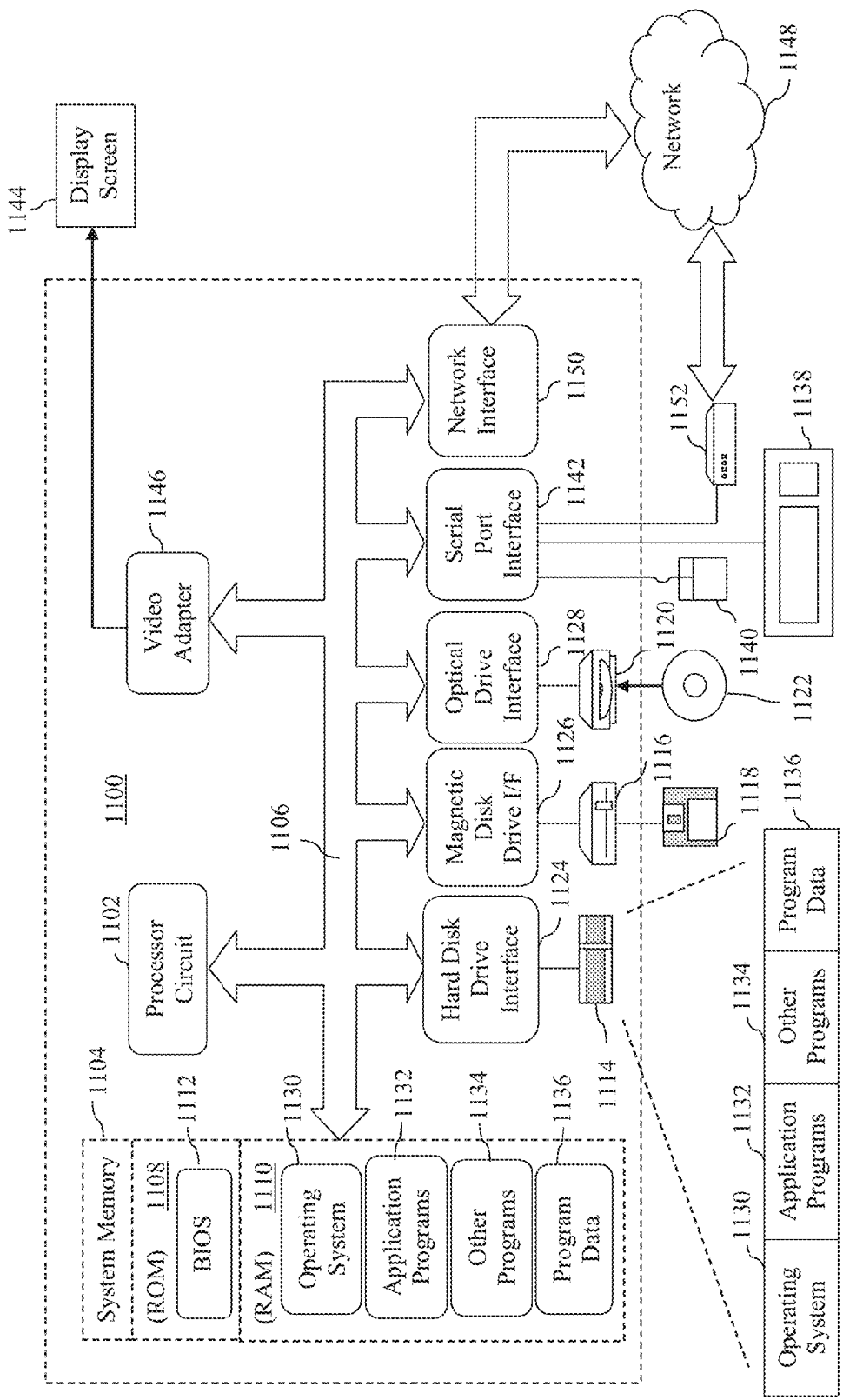
FIG. 11 shows a block diagram of an example computing device that may be used to implement embodiments.

Furthermore, FIG. 11 depicts an exemplary implementation of a computing device 1100 in which embodiments may be implemented. For example, mobile communications device 102 and/or second communications device 202 may be implemented in one or more computing devices similar to computing device 1100 in stationary computer embodiments, including one or more features of computing device 1100 and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing object determiner 106, object detector 506, object identifier 508, beam scanner controller 510, spatial relationship determiner 512, communication signal controller 514, material comparator 810, map generator 812, shape comparator 814, flowchart 400, flowchart 600, flowchart 700, flowchart 900, and/or flowchart 910 (including any suitable step of flowcharts 400, 600, 700, 900, and/or 910), and/or further embodiments described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nano-technology-based storage devices, and further types of physical/tangible hardware storage media (including memory 1020 of FIG. 10). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In one embodiment, a method is provided, comprising: scanning a communication space with a beam-shaped signal transmitted by a phased antenna array; receiving information discerned from one or more attenuated signals received from the communication space based on the beam-shaped signal; analyzing the information to determine an object in the communication space; determining that the object is likely at least a portion of a human; and modifying a communication signal transmitted by the phased antenna array based on determining that the at least a portion of a human has a predetermined spatial relationship with the phased antenna array.

In an embodiment, the receiving comprises: receiving the information from a communications device that received the one or more attenuated signals.

In an embodiment, the information indicates a received power of the one or more attenuated signals at the communications device; and said analyzing comprises: determining a path loss based on difference between a transmitted power of the beam-shaped signal and the received power of the one or more attenuated signals.

In an embodiment, the receiving comprises: receiving, by at least one antenna of the mobile communications device, the one or more attenuated signals as one or more reflected signals.

In an embodiment, the information indicates a received power of the one or more reflected signals at the mobile communications device; and said analyzing comprises: determining a power loss based on a difference between a transmitted power of the beam-shaped signal and the received power of the one or more reflected signals.

In an embodiment, the analyzing comprises: determining the object in the communication space based on at least one of an absorbed power or a reflected power for the object; and the determining that the object is likely at least a portion of a human comprises: determining that the absorbed power or the reflected power for the object substantially matches that of a human.

In an embodiment, the determining that the object is likely at least a portion of a human comprises: constructing a power map as a map of path loss, absorbed power, or reflected power for the communication space; determining a shape of the object based on the power map; and determining that the shape of the object substantially matches that of at least a portion of a human.

In another embodiment, a device comprises: a phased antenna array; at least one processor circuit; and at least one memory device that stores program code configured to be executed by the at least one processor circuit, the program code comprising: a beam scanner controller configured to control the phased antenna array to transmit a beam-shaped signal to scan a communication space; an object detector configured to receive information discerned from one or more attenuated signals received from the communication space based on the beam-shaped signal, and to analyze the information to determine an object in the communication space; an object identifier configured to determine whether the object is likely at least a portion of a human; a spatial relationship determiner configured to, based on determining the object is likely at least a portion of a human, determine whether the at least a portion of a human has a predetermined spatial relationship with the phased antenna array; and a communication signal controller configured to modify a communication signal transmitted by the phased antenna array based on determining that the at least a portion of a human has the predetermined spatial relationship with the phased antenna array.

In an embodiment, the device further comprises: a transceiver that receives the information from a communications device that received the one or more attenuated signals.

In an embodiment, the information indicates a received power of the one or more attenuated signals at the communications device; and the object detector is configured to determine a path loss based on a difference between a transmitted power of the beam-shaped signal and the received power of the one or more attenuated signals.

In an embodiment, the device further comprises: a transceiver that receives, by at least one antenna of the device, the one or more attenuated signals as one or more reflected signals.

In an embodiment, the information indicates a received power of the one or more reflected signals at the device; and the object detector is configured to determine a power loss based on difference between a transmitted power of the beam-shaped signal and the received power of the one or more reflected signals.

In an embodiment, the object detector is configured to determine the object in the communication space based on at least one of an absorbed power or a reflected power for the object; and the object identifier is configured to determine that the object is likely at least a portion of a human by determining that the absorbed power or the reflected power for the object substantially matches that of a human.

In an embodiment, the object identifier is configured to: construct a power map as a map of path loss, absorbed power, or reflected power for the communication space; determine a shape of the object based on the power map; and determine that the shape of the object substantially matches that of at least a portion of a human.

In another embodiment, a device comprises: a phased antenna array; and a circuit in communication with the antenna, the circuit configured to: scan a communication space with a beam-shaped signal transmitted by the phased antenna array; receive information discerned from one or more attenuated signals received from the communication space based on the beam-shaped signal; analyze the information to determine an object in the communication space; determine that the object is likely at least a portion of a human; and modify a communication signal transmitted by the phased antenna array in response to determining that the at least a portion of a human has a predetermined spatial relationship with the phased antenna array.

In an embodiment, the circuit is configured to receive the information from a communications device that received the one or more attenuated signals.

In an embodiment, the information indicates a received power of the one or more attenuated signals at the communications device; and the circuit is configured to determine a path loss based on difference between a transmitted power of the beam-shaped signal and the received power of the one or more attenuated signals.

In an embodiment, the circuit is configured to receive, by at least one antenna of the device, the one or more attenuated signals as one or more reflected signals.

In an embodiment, the information indicates a received power of the one or more reflected signals at the device; and the circuit is configured to determine a power loss based on a difference between a transmitted power of the beam-shaped signal and the received power of the one or more reflected signals.

In an embodiment, the circuit is configured to: determine the object in the communication space based on at least one of an absorbed power or a reflected power for the object; and determine that the absorbed power or the reflected power for the object substantially matches that of a human to determine that the object is likely at least a portion of a human.

In still another embodiment, a device comprises: means for scanning a communication space with a beam-shaped signal transmitted by a phased antenna array; means for receiving information discerned from one or more attenuated signals received from the communication space based on the beam-shaped signal; means for analyzing the information to determine an object in the communication space; means for determining that the object is likely at least a portion of a human; and means for modifying a communication signal transmitted by the phased antenna array based on determining that the at least a portion of a human has a predetermined spatial relationship with the phased antenna array.

In an embodiment, the means for receiving comprises: means for receiving the information from a communications device that received the one or more attenuated signals.

In an embodiment, the information indicates a received power of the one or more attenuated signals at the communications device; and the means for analyzing comprises: means for determining a path loss based on difference between a transmitted power of the beam-shaped signal and the received power of the one or more attenuated signals.

In an embodiment, the means for receiving comprises: receiving, by at least one antenna of the mobile communications device, the one or more attenuated signals as one or more reflected signals.

In an embodiment, the information indicates a received power of the one or more reflected signals at the mobile communications device; and the means for analyzing comprises: determining a power loss based on a difference between a transmitted power of the beam-shaped signal and the received power of the one or more reflected signals.

In an embodiment, the means for analyzing comprises: determining the object in the communication space based on at least one of an absorbed power or a reflected power for the object; and the means for determining that the object is likely at least a portion of a human comprises: determining that the absorbed power or the reflected power for the object substantially matches that of a human.

In an embodiment, the means for determining that the object is likely at least a portion of a human comprises: means for constructing a power map as a map of path loss, absorbed power, or reflected power for the communication space; means for determining a shape of the object based on the power map; and means for determining that the shape of the object substantially matches that of at least a portion of a human.

What is claimed is:

1. A method comprising:
   scanning a communication space with a beam-shaped signal transmitted by a phased antenna array;
   receiving information discerned from one or more attenuated signals received from the communication space based on the beam-shaped signal;
   analyzing the information to determine an object in the communication space;
   determining that the object is likely at least a portion of a human; and
   modifying a communication signal transmitted by the phased antenna array based on determining that the at least a portion of a human has a predetermined spatial relationship with the phased antenna array.

2. The method of claim 1, wherein said receiving comprises:
   receiving the information from a communications device that received the one or more attenuated signals.

3. The method of claim 2, wherein the information indicates a received power of the one or more attenuated signals at the communications device; and
   said analyzing comprises:
      determining a path loss based on difference between a transmitted power of the beam-shaped signal and the received power of the one or more attenuated signals.

4. The method of claim 1, wherein said receiving comprises:
receiving, by at least one antenna of the mobile communications device, the one or more attenuated signals as one or more reflected signals.

5. The method of claim 4, wherein the information indicates a received power of the one or more reflected signals at the mobile communications device; and
said analyzing comprises:
determining a power loss based on a difference between a transmitted power of the beam-shaped signal and the received power of the one or more reflected signals.

6. The method of claim 1, wherein said analyzing comprises:
determining the object in the communication space based on at least one of an absorbed power or a reflected power for the object; and
said determining that the object is likely at least a portion of a human comprises:
determining that the absorbed power or the reflected power for the object substantially matches that of a human.

7. The method of claim 6, wherein said determining that the object is likely at least a portion of a human comprises:
constructing a power map as a map of path loss, absorbed power, or reflected power for the communication space;
determining a shape of the object based on the power map; and
determining that the shape of the object substantially matches that of at least a portion of a human.

8. A device comprising:
a phased antenna array;
at least one processor circuit; and
at least one memory device that stores program code configured to be executed by the at least one processor circuit, the program code comprising:
a beam scanner controller configured to control the phased antenna array to transmit a beam-shaped signal to scan a communication space;
an object detector configured to receive information discerned from one or more attenuated signals received from the communication space based on the beam-shaped signal, and to analyze the information to determine an object in the communication space;
an object identifier configured to determine whether the object is likely at least a portion of a human;
a spatial relationship determiner configured to, based on determining the object is likely at least a portion of a human, determine whether the at least a portion of a human has a predetermined spatial relationship with the phased antenna array; and
a communication signal controller configured to modify a communication signal transmitted by the phased antenna array based on determining that the at least a portion of a human has the predetermined spatial relationship with the phased antenna array.

9. The device of claim 8, further comprising:
a transceiver that receives the information from a communications device that received the one or more attenuated signals.

10. The device of claim 9, wherein the information indicates a received power of the one or more attenuated signals at the communications device; and
the object detector is configured to determine a path loss based on a difference between a transmitted power of the beam-shaped signal and the received power of the one or more attenuated signals.

11. The device of claim 8, further comprising:
a transceiver that receives, by at least one antenna of the device, the one or more attenuated signals as one or more reflected signals.

12. The device of claim 11, wherein the information indicates a received power of the one or more reflected signals at the device; and
the object detector is configured to determine a power loss based on difference between a transmitted power of the beam-shaped signal and the received power of the one or more reflected signals.

13. The device of claim 8, wherein the object detector is configured to determine the object in the communication space based on at least one of an absorbed power or a reflected power for the object; and
the object identifier is configured to determine that the object is likely at least a portion of a human by determining that the absorbed power or the reflected power for the object substantially matches that of a human.

14. The device of claim 13, wherein the object identifier is configured to:
construct a power map as a map of path loss, absorbed power, or reflected power for the communication space;
determine a shape of the object based on the power map; and
determine that the shape of the object substantially matches that of at least a portion of a human.

15. A device comprising:
a phased antenna array; and
a circuit in communication with the antenna, the circuit configured to:
scan a communication space with a beam-shaped signal transmitted by the phased antenna array;
receive information discerned from one or more attenuated signals received from the communication space based on the beam-shaped signal;
analyze the information to determine an object in the communication space;
determine that the object is likely at least a portion of a human; and
modify a communication signal transmitted by the phased antenna array in response to determining that the at least a portion of a human has a predetermined spatial relationship with the phased antenna array.

16. The device of claim 15, wherein the circuit is configured to receive the information from a communications device that received the one or more attenuated signals.

17. The device of claim 16, wherein the information indicates a received power of the one or more attenuated signals at the communications device; and
the circuit is configured to determine a path loss based on difference between a transmitted power of the beam-shaped signal and the received power of the one or more attenuated signals.

18. The device of claim 16, wherein the circuit is configured to:
determine the object in the communication space based on at least one of an absorbed power or a reflected power for the object; and
determine that the absorbed power or the reflected power for the object substantially matches that of a human to determine that the object is likely at least a portion of a human.

19. The device of claim 15, wherein the circuit is configured to receive, by at least one antenna of the device, the one or more attenuated signals as one or more reflected signals.

20. The device of claim 19, wherein the information indicates a received power of the one or more reflected signals at the device; and the circuit is configured to determine a power loss based on a difference between a transmitted power of the beam-shaped signal and the received power of the one or more reflected signals.

* * * * *